Jan. 25, 1966   E. HERION   3,231,233
THROUGH-WAY MAGNETIC VALVE
Filed May 6, 1964
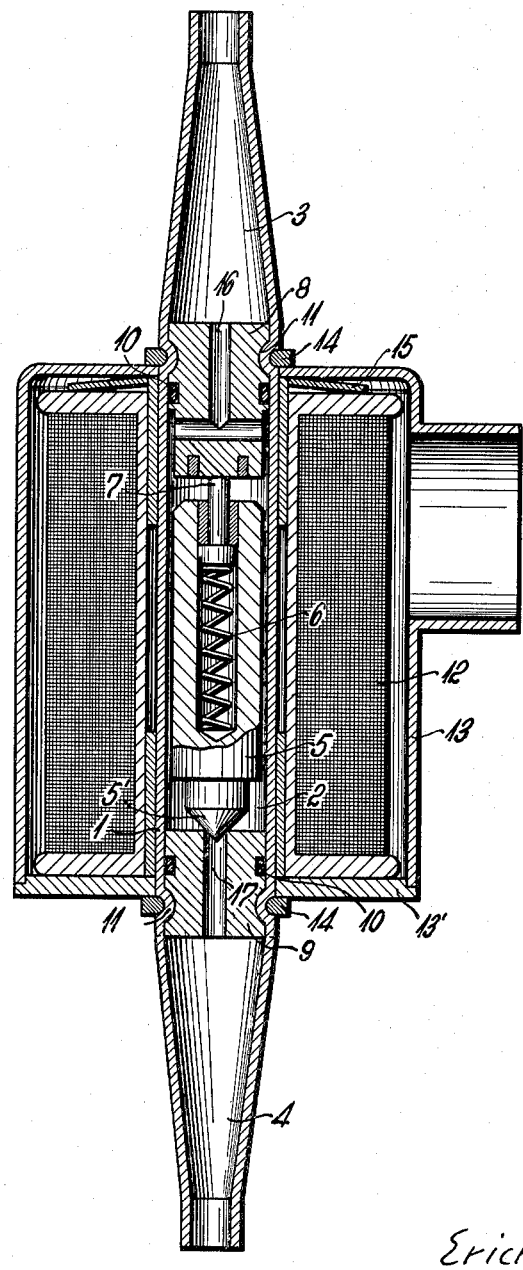
INVENTOR
Erich Herion
By Richard Curb
Ag't 3,231,233
THROUGH-WAY MAGNETIC VALVE
Erich Herion, 22 Distlerstrasse, Stuttgart-Frauenkopf, Germany
Filed May 6, 1964, Ser. No. 365,379
Claims priority, application Germany, May 9, 1963, H 49,102
6 Claims. (Cl. 251—139)

The invention relates to through-way or multi-way magnetic valves, comprising a magnet guide sleeve formed by a tube or tubular member and a magnetic armature fitted thereinto and carrying the closing member, whereby the interior of the tube is connected with inlet and outlet passages between which the armature is displaceably located.

The present invention is based on the fact that the screw connections, welded joints, and the like, used for joining parts of valves, result in a complicated construction and aims at avoiding such structure by providing supporting members or abutments in said tube, whereby at least one of the abutments carries a valve seat. The abutments which are provided with the aforesaid passages are held in place by means of internal embossments or interiorly directed projections provided on the wall of the tube. A magnetic coil is pushed over the tube and secured by means of holding means, for instance, clamping rings. Clamping rings are preferably made to engage external depressions in the tube wall, formed by the referred-to internal embossments or interiorly directed projections. By means of these connections which can be loosened from the outside, the magnetic coil may be fitted over the tubular member so that both the assembly and the dismantling is very much facilitated.

According to a further feature of the invention, the supporting members have on their outer circumference recesses, and the tube is axially fixed by having its interiorly directed projections engage these recesses. The recesses may be formed, for example, by circumferential grooves. The magnetic coil is fixed on the tube by annular clamping members, clamps or the like, which may be clamped on to the tube and which are received in the aforementioned embossments.

Finally, according to yet another feature of the invention, in order to produce a tight passage of the medium to be controlled through the tube which serves as a magnet guide sleeve, the supporting members are placed by means of O-rings into sealing contact with the magnet guide sleeve. In this manner one obtains a valve construction without screw connections or soldered joints, in which the parts are simply pushed together and fixed to the tubular part by the deformation of the material.

The invention will be further described, by way of example, with reference to the embodiment shown in cross-section in the accompanying drawing, and containing all parts necessary for the understanding of the invention.

The drawing shows a through-way valve, the valve housing of which is formed by an open tubular member 1 forming the magnet guide sleeve, whilst the inner cavity 2 serves to carry the medium to be controlled. The tubular section 1, having simultaneously the function of a valve housing, has on its ends connections 3 and 4 in the shape of subsequently drawn-in conical transitional sections. The cavity 2 receives a magnetic armature 5 which carries a part 5' serving as closing member. The magnetic armature rests by means of a pin 7 displaceable against the force of a spring 6 against a fixed abutment 8 of the sleeve, and its part 5' collaborates with a valve seat in the supporting bearing 9. The supporting bearings 8 and 9 are mounted in the tubular section 1 by means of an O-ring 10 so as to form a fluid-tight and gas-tight seal and are located in the tubular section 1 by means of external circumferential recesses 11 engaging into recesses of the supporting bearings 8 and 9.

From the outside, a magnetic coil 12 and a housing 13 are pushed over the tubular section 1. The magnetic coil 12 and the housing 13 are located in position by means of clamping rings 14 fitted into embossings 11 on the magnet guide sleeve 1. The magnetic coil 12 is urged under bias by a plate spring in the housing 13 against the base plate 13', resting in turn on the clamping ring 14.

Through the connection 3 and a bore 16 in the supporting bearing 8, the medium flows into the cavity 2 containing the magnetic armature 5, and after lifting the magnetic armature 5, through the bore 17 in the valve seat to the connection 4.

In order to assemble the through-way valve shown and already equipped with the connection 3, the upper supporting bearing 8 with its outer recess is fitted into the tubular member 1 and located by means of the embossing 11. Then the magnetic armature 5 and the lower supporting bearing 9 with the valve seat are placed into the tubular section 1 and also fixed by means of an embossing 11. Then the tubular section 1 can be equipped with the connection 4. Prior to fitting the magnetic coil 12, a clamping ring 14 is fitted, say, into the lower embossing 11. After the fitting of the magnetic coil 12 and of the housing 13, as well as of the annular washer 15, a clamping ring 14 is fitted into the upper embossing 11 so that the magnetic coil 12 is retained under bias undisplaceably on the magnet guide sleeve 1.

What I claim is:

1. A valve comprising a tubular member, two abutments spacedly fitted into said tubular member, inlet and outlet bores in said abutments, a magnetic armature received in said tubular member for movements between said abutment and said inlet and outlet bores, at least one of said abutments being equipped with a valve seat, said armature having a closing member cooperating with said valve seat, said tubular member being spacedly provided with interiorly directed projections and external depressions, said projections axially securing said abutments, a magnetic coil enveloping said tubular member, and holding means received in said depressions.

2. The valve according to claim 1, said abutments having outer surfaces provided with recesses to receive said projections.

3. In the valve according to claim 1, O-ring means provided between said abutments and the inner face of said tubular member to serve as fluid-tight and gas-tight seals.

4. In the valve according to claim 1, said projections and depressions being constituted by two circumferentially extending internal ribs and two circumferentially extending external grooves, respectively, and said holding means being constituted by two clamping rings.

5. In the valve according to claim 4, a housing enclosing said magnetic coil and being held between said clamping rings, said magnetic coil having two end faces, a plate spring disposed between the inner face of said housing and one of said end faces and securing said magnetic coil in place.

6. In the valve according to claim 1, said tubular member having conical outwardly tapering end portions.

References Cited by the Examiner
UNITED STATES PATENTS

| 283,544 | 8/1883 | Weston | 251—139 X |
| 2,279,243 | 4/1942 | Parsons | 251—139 |
| 2,614,584 | 10/1952 | Goepfrich | 251—139 |

MARTIN P. SCHWADRON, Acting Primary Examiner.